(12) United States Patent
Dickson

(10) Patent No.: US 6,985,459 B2
(45) Date of Patent: Jan. 10, 2006

(54) EARLY TRANSMISSION AND PLAYOUT OF PACKETS IN WIRELESS COMMUNICATION SYSTEMS

(75) Inventor: Scott M. Dickson, Carlsbad, CA (US)

(73) Assignee: Qualcomm Incorporated, San Diego, CA (US)

( * ) Notice: Subject to any disclaimer, the term of this patent is extended or adjusted under 35 U.S.C. 154(b) by 156 days.

(21) Appl. No.: 10/225,993

(22) Filed: Aug. 21, 2002

(65) Prior Publication Data

US 2004/0037320 A1  Feb. 26, 2004

(51) Int. Cl.
*H04J 3/16* (2006.01)
*H04J 3/24* (2006.01)

(52) U.S. Cl. .................... 370/328; 370/465; 370/469; 370/473; 370/474

(58) Field of Classification Search ........ 370/473–474, 370/469, 328, 310, 412, 465, 401, 428–429, 370/389, 392, 471; 709/246, 247, 236
See application file for complete search history.

(56) References Cited

U.S. PATENT DOCUMENTS

| | | | | |
|---|---|---|---|---|
| 5,307,345 | A * | 4/1994 | Lozowick et al. | 370/428 |
| 5,434,872 | A * | 7/1995 | Petersen et al. | 714/811 |
| 5,559,963 | A * | 9/1996 | Gregg et al. | 709/234 |
| 5,732,094 | A * | 3/1998 | Petersen et al. | 714/805 |
| 5,872,920 | A * | 2/1999 | Hausman et al. | 709/250 |
| 5,926,473 | A * | 7/1999 | Gridley | 370/389 |
| 6,144,668 | A * | 11/2000 | Bass et al. | 370/401 |
| 6,229,808 | B1 * | 5/2001 | Teich et al. | 370/398 |
| 6,233,243 | B1 * | 5/2001 | Ganmukhi et al. | 370/412 |
| 6,308,228 | B1 * | 10/2001 | Yocum et al. | 710/52 |
| 6,366,961 | B1 * | 4/2002 | Subbiah et al. | 709/238 |
| 6,594,276 | B1 * | 7/2003 | Le | 370/465 |
| 6,614,808 | B1 * | 9/2003 | Gopalakrishna | 370/469 |
| 6,618,397 | B1 * | 9/2003 | Huang | 370/474 |
| 6,711,164 | B1 * | 3/2004 | Le et al. | 370/392 |
| 6,721,333 | B1 * | 4/2004 | Milton et al. | 370/469 |
| 2001/0025321 | A1 * | 9/2001 | Tang et al. | 709/246 |
| 2002/0021698 | A1 * | 2/2002 | Lee et al. | 370/394 |
| 2003/0198184 | A1 * | 10/2003 | Huang et al. | 370/231 |
| 2004/0028009 | A1 * | 2/2004 | Dorenbosch et al. | 370/329 |
| 2004/0057446 | A1 * | 3/2004 | Varsa et al. | 370/412 |

OTHER PUBLICATIONS

Simpson, W., "RFC 1853—IP in IP Tunneling", Oct. 1995.*

* cited by examiner

*Primary Examiner*—Seema S. Rao
*Assistant Examiner*—Robert C. Scheibel, Jr.
(74) *Attorney, Agent, or Firm*—Philip Wadsworth; Sandra L. Godsey; Kent D. Baker

(57) ABSTRACT

Techniques to start the transmission of packets early at a transmitting device and to play out received packets early at a receiving device in a wireless communication system. In one method for early packet transmission, a set of data frames to be bundled in a packet is received (e.g., from a voice application). One or more headers for the packet are generated for one or more protocols in the protocol stack (which may include RTP, UDP, IP, PPP, and RLP, or variants thereof). A transmission frame suitable for transmission over the air is generated as a sufficient amount of data in the header(s) and the data frames becomes available. Transmission frames are generated prior to receiving all of the data frames to be bundled in the packet. A header may be appended to each data frame and would include pertinent information used to recover and/or process the data frame.

28 Claims, 10 Drawing Sheets

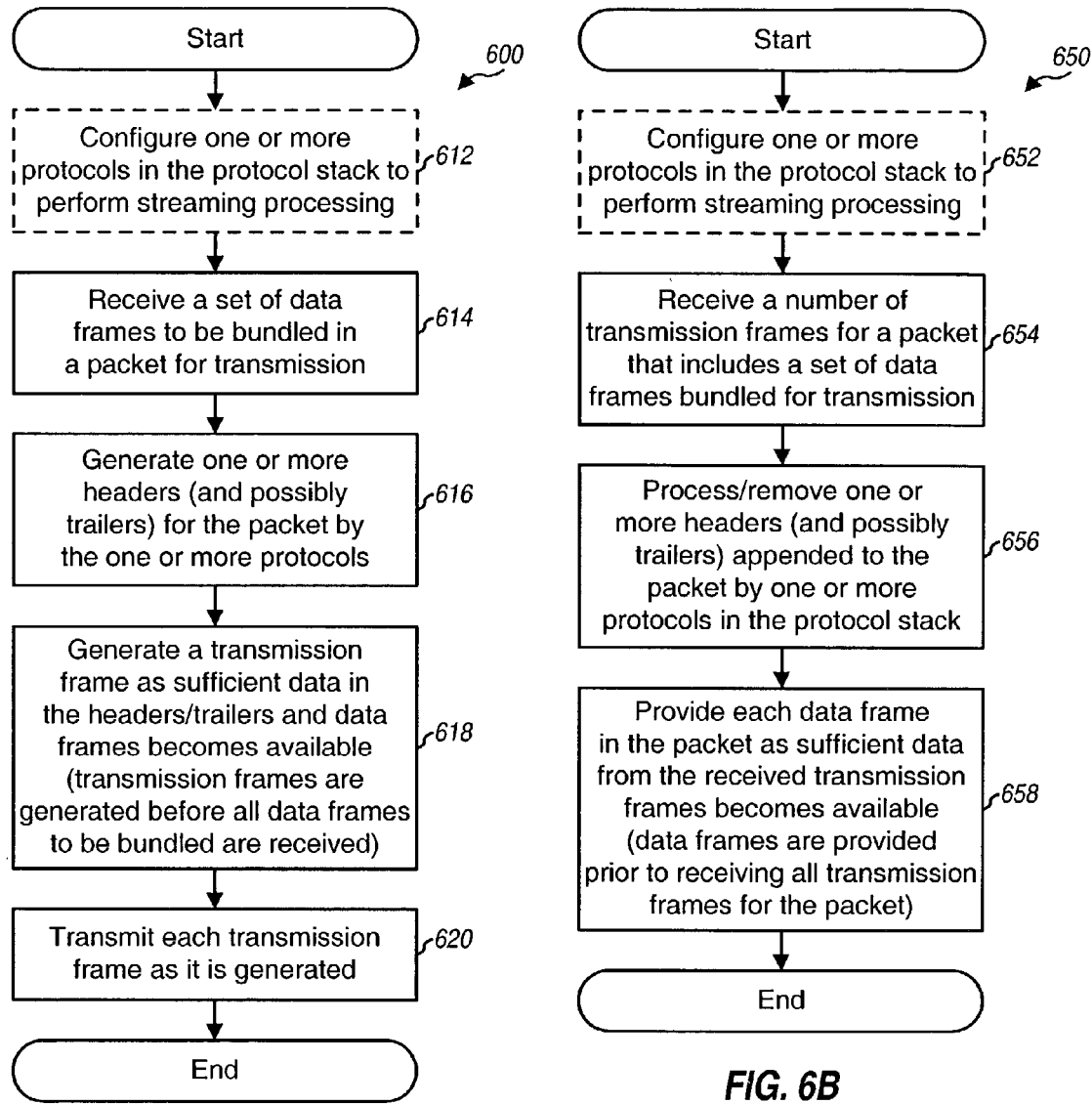

EARLY TRANSMISSION AND PLAYOUT OF PACKETS IN WIRELESS COMMUNICATION SYSTEMS

BACKGROUND

1. Field

The present invention relates generally to data communication, and more specifically to techniques for starting transmission of packets early at a transmitting device and playing out received packets early at a receiving device to reduce delays.

2. Background

Wireless communication systems are widely deployed to provide various types of communication such as voice, packet data, and so on. These systems may be multiple-access systems (e.g., CDMA and GSM systems) capable of supporting communication with multiple users.

For a given communication system, data is typically processed by a number of protocols for a number of layers in a protocol stack at both the transmitting and receiving devices. As an example, the protocol stack for each device may include the following protocols: RTP, UDP/TCP, IP, PPP, and RLP (all are described below). Conventionally, the processing by the protocol at each layer does not start until all data needed to generate a complete data unit (e.g., a packet) is received by that protocol. Thus, for data transmission (or reception), each protocol processes complete packets received from the next higher (or lower) layer and provides complete processed packets to the next lower (or higher) layer. This processing on complete packets is acceptable for many applications (e.g., packet data) that are not sensitive to processing and transmission delays.

For certain applications (e.g., real-time applications such as voice and video), the processing and transmission delays can have a large impact on performance. Moreover, some applications (e.g., voice) provide data in frames that are smaller in size than a typical-size packet. To improve efficiency, multiple data frames may then be bundled into each packet for transmission. The bundling of the data frames and the processing on complete packets can result in longer delays at both the transmitting and receiving devices. For real-time applications, performance may be impacted by the longer delays.

There is therefore a need in the art for techniques to process data in a manner to reduce processing and transmission delays.

SUMMARY

Techniques are provided herein to start the transmission of packets early at a transmitting device and to play out received packets early at a receiving device. These techniques may be used to reduce processing and transmission delays, which is highly desirable for many real-time applications such as voice, video, control data, and so on.

In one embodiment, a method is provided for processing data for transmission in a wireless (e.g., CDMA) communication system. In accordance with the method, a set of data frames to be bundled in a packet for transmission is received. These data frames may be provided by a particular (e.g., voice) application and may have fixed or variable sizes. One or more headers for the packet are generated for one or more protocols in the protocol stack. As an example, the protocol stack may include RTP, UDP, IP, PPP, and RLP or variants thereof (described below). A transmission frame suitable for transmission over the air is generated as a sufficient amount of data in the one or more headers and the data frames becomes available. Transmission frames are thus generated prior to receiving all of the data frames to be bundled in the packet.

A header may be appended to each data frame and may include pertinent information used to recover and/or process the data frame. This information may indicate, for example, the rate or size of the data frame. The header generated by the UDP may include a zero checksum or a pre-selected checksum for the packet. If the pre-selected checksum is included, then a set of tail bytes is added to the packet that causes a computed packet checksum to match the pre-selected checksum.

In another embodiment, a method is provided for processing data at a receiving device. In accordance with the method, a number of transmission frames is received for a packet having included therein a set of data frames bundled together for transmission. One or more headers appended to the packet for one or more protocols in the protocol stack are removed. Each data frame in the packet is provided as a sufficient amount of data in the received transmission frames becomes available. The data frames are thus provided prior to receiving all transmission frames for the packet.

The packet may further be checked based on a checksum included in one of the one or more headers. For each data frame, a header appended to each data frame may be obtained, and the data frame may be processed based on information included in the data frame header.

Various aspects and embodiments of the invention are described in further detail below. The invention further provides methods, program codes, digital signal processors, devices, terminals, base stations, systems, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein:

FIG. 6A is a flow diagram of a process to perform early packet transmission;

FIG. 6B is a flow diagram of a process to perform early packet playout; and

DETAILED DESCRIPTION

Figure 1:
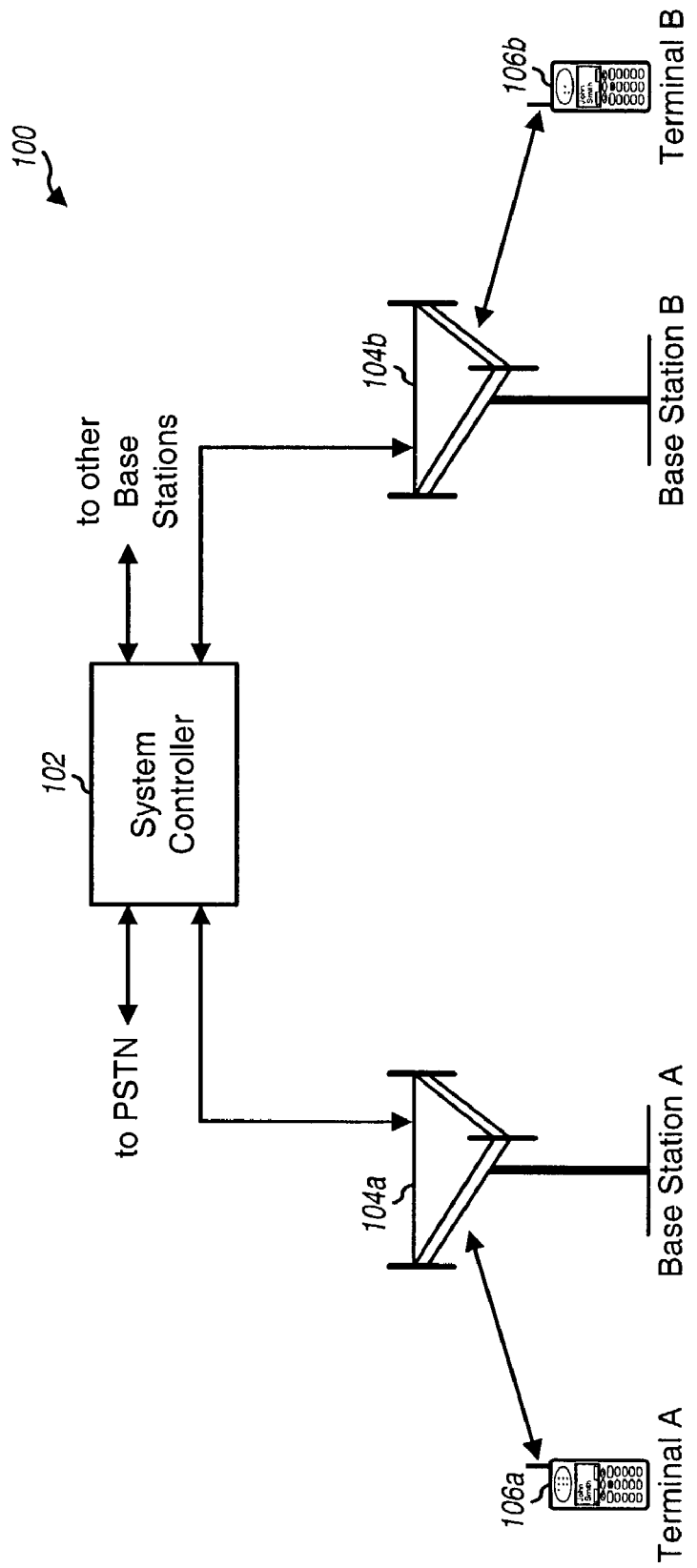
FIG. 1 is a diagram of a wireless communication system.

FIG. 1 is a diagram of a wireless communication system 100 that can implement the early transmission and playout of packets. System 100 includes a number of base stations 104 that communicate with a number of terminals 106 (only two base stations and two terminals are shown in FIG. 1 for simplicity). A base station is a fixed station used for communicating with the terminals. A base station may also be referred to as a base transceiver system (BTS), an access point, a Node B, or some other terminology.

A terminal is a station that communicates with the base station. A terminal may also be referred to as a mobile station, a remote station, an access terminal, a user equipment (UE), or some other terminology. Each terminal may communicate with one or more base stations on the forward link and/or reverse link at any given moment, depending on whether or not the terminal is active, whether or not soft handoff is supported for the data transmission, and whether or not the terminal is in soft handoff. The forward link (i.e., downlink) refers to transmission from the base station to the terminal, and the reverse link (i.e., uplink) refers to transmission from the terminal to the base station.

A system controller 102 couples to base stations 104 and may further couple to a public switched telephone network (PSTN) and/or a packet data network (PDN). System controller 102 may also be referred to as a base station controller (BSC), a mobile switching center (MSC), a radio network controller (RNC), or some other terminology. System controller 102 provides coordination and control for the base stations coupled to it. Via the base stations, system controller 102 further controls the routing of calls (1) among the terminals, and (2) between the terminals and other users coupled to the PSTN (e.g., conventional telephones) and PDN.

The techniques described herein for early packet transmission and playout may be implemented in various wireless communication systems. Thus, system 100 may be a code division multiple access (CDMA) system, a time division multiple access (TDMA) system, or some other type of system. A CDMA system may be designed to implement one or more standards such as cdma2000, IS-856, W-CDMA, IS-95, and so on. A TDMA system may be designed to implement one or more standards such as Global System for Mobile Communications (GSM). These standards are well known in the art and incorporated herein by reference.

Figure 2:
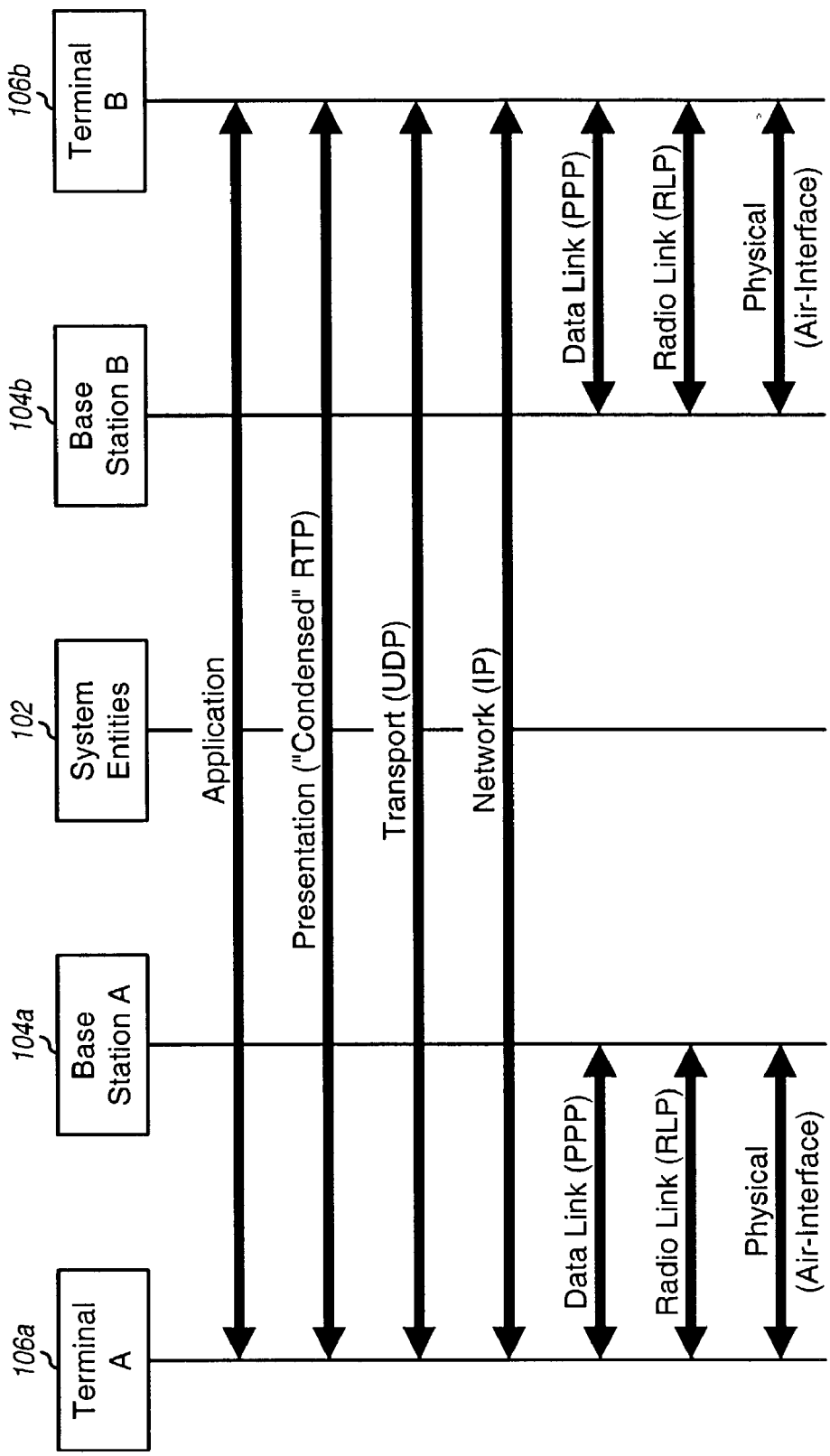
FIG. 2 shows a protocol stack for a session between two terminals.

FIG. 2 is a diagram of a specific embodiment of a protocol stack that may be established for a communication session between two terminals in the wireless communication system. In this embodiment, the end-to-end communication between terminals A and B is supported by the following layers: an application layer, a presentation layer, a transport layer, and a network layer.

The application layer may include various end applications, such as those that support voice, video, data collection, and so on. The presentation layer provides end-to-end network transport functions and may utilize the Real-Time Transport Protocol (RTP), a "Condensed" RTP, or some other protocol. The RTP can provide end-to-end delivery services for data with real-time characteristics, such as payload type identification, sequence numbering, time-stamping, delivery monitoring, and so on. RTP is described in detail in RFC1889, entitled "RTP: A Transport Protocol for Real-Time Applications," January 1996, which is publicly available and incorporated herein by reference. The Condensed RTP is a modified version of the RTP and is described in further detail below.

The transport layer may utilize the User Datagram Protocol (UDP), the Transmission Control Protocol (TCP), or some other protocol. The UDP is a transport protocol that supports the transmission of messages with a minimum of protocol mechanism. Since the UDP does not provide reliability mechanisms, it is typically used when reliability is not required and for real-time applications where retransmission is not necessary or is useless. The TCP is a reliable transport protocol that keeps track of the communication between two devices and provides error detection and error recovery mechanisms. The UDP is described in detail in RFC768, entitled "User Datagram Protocol," August 1980, and the TCP is described in detail in RFC793, entitled "Transmission Control Protocol DARPA Internet Program Protocol Specification," September 1981, both of which are publicly available and incorporated herein by reference.

The network layer may utilize the Internet Protocol (IP), which is a connection-less protocol. With this protocol, each IP packet travels independently until it arrives at the destination device. IP packets may be split into multiple IP packets while in transit and are put back together at the destination device. IP packets may arrive out of sequence and a higher-level protocol such as TCP may put the packets back in the original sequence if required by the application. To provide enhanced compatibility and connectivity with other networks, the base stations and other entities (e.g., system controller 102) in the backbone of the wireless communication system can exchange data using IP. The IP is described in detail in RFC961, entitled "Internet Protocol DARPA Internet Program Protocol Specification," September 1981, which is publicly available and incorporated herein by reference.

In the embodiment shown in FIG. 2, the communication between each terminal and its "reference" base station is further supported by a data link layer, a radio link layer, and a physical layer. The data link layer may utilize the point-to-point protocol (PPP) to carry IP packets. The PPP and other protocols above it are not aware that they are utilizing a wireless physical layer and behave in the same manner as for a wire-line session. The PPP also employs a cyclic redundancy check (CRC) to identify transmission errors. The PPP is described in detail in RFC1661, entitled "The Point-to-Point Protocol (PPP)," July 1994, which is publicly available and incorporated herein by reference.

The radio link protocol (RLP) provides error detection and error correction for the wireless link and is designed to reduce the air-link frame error rate (FER) to a level where higher layer protocols can operate effectively. The RLP can be configured to attempt to achieve a frame error rate on the order of $10^{-6}$. The transmitter RLP receives data to be transmitted and forms RLP frames for transmission over the air. The receiver RLP subsequently puts back the received RLP frames in the appropriate order after the transmission. The RLP keeps track of the RLP frames and is able to retransmit RLP frames received in error. The RLP is unaware of any framing that is done by the protocols above it. The RLP is dependent on the specific air-interface used by the system and is described in detail in the cdma2000, IS-856, W-CDMA, IS-95, and GSM standards. Some air interface standards allow the RLP retransmission policy to be configured so that bandwidth is not wasted on retransmissions if the retransmitted frames would arrive too late to be useful in real-time applications such as Voice over IP. Other protocols may also be used in place of RLP to generate transmission frames for PPP packets.

The physical layer between the terminal and base station is an air-interface that may conform to any standard (e.g., cdma2000, IS-856, W-CDMA, IS-95, GSM, and so on). The physical layer provides modem and framing functions for the wireless air-interface.

Conventionally, the data processing for a given protocol stack is performed such that the protocol in each layer processes and passes complete data units (e.g., packets or datagrams) to the protocol in the next lower layer (for data transmission) or the next higher layer (for data reception). For example, for the protocol stack shown in FIG. 2, the RTP would process and pass complete RTP packets to the UDP, which would process the RTP packets and pass complete UDP datagrams to the IP, which would process the UDP datagrams and pass complete IP packets to the PPP. The lengths of the RTP packets, UDP datagrams, and IP packets may or may not be the same. On the transmission side, the protocol in each layer would then wait until it receives a sufficient amount of data from the next higher layer before it starts processing the data to generate a packet/datagram, which would then be provided to the next lower layer. For simplicity, the data unit for each protocol is referred to as a "packet".

The processing of complete packets is typically acceptable for packet data, which is normally bursty in nature and also not sensitive to processing and transmission delays. In this case, large blocks of data may be processed and transmitted whenever resources become available. However, the processing of complete packets is undesirable for some applications such as voice, video, and other real-time applications.

As an example, a voice application may generate voice frames that are relatively small in size. Since the protocol in each layer below the application layer typically inserts a header and possibly a trailer for each packet that it generates, the overhead for the header/trailer may be reduced (percentage-wise) by bundling multiple voice frames into each packet. Unfortunately, this bundling increases delays in communication since (1) the transmitting terminal needs to wait for multiple periods to collect a bundle of voice frames for each packet to be transmitted and (2) the receiving terminal needs to wait until all components of each packet are received before it processes the packet to recover the voice frames, which may then be provided for playout.

Techniques are provided herein to reduce the delays associated with bundling a number of data frames for each packet by (1) starting the processing and transmission of the packet early at the transmitter and (2) playing out the received packet early at the receiver. These techniques may be implemented in various manners and with various protocol stacks.

For clarity, a specific embodiment is described below for a communication between terminals A and B in the wireless communication system. In this embodiment, the protocol stack for each terminal includes the following layers (and protocols): application layer, presentation layer (Condensed RTP), transport layer (UDP), network layer (IP), data link layer (PPP), radio link layer (RLP), and physical layer (air-interface).

Figure 3A:
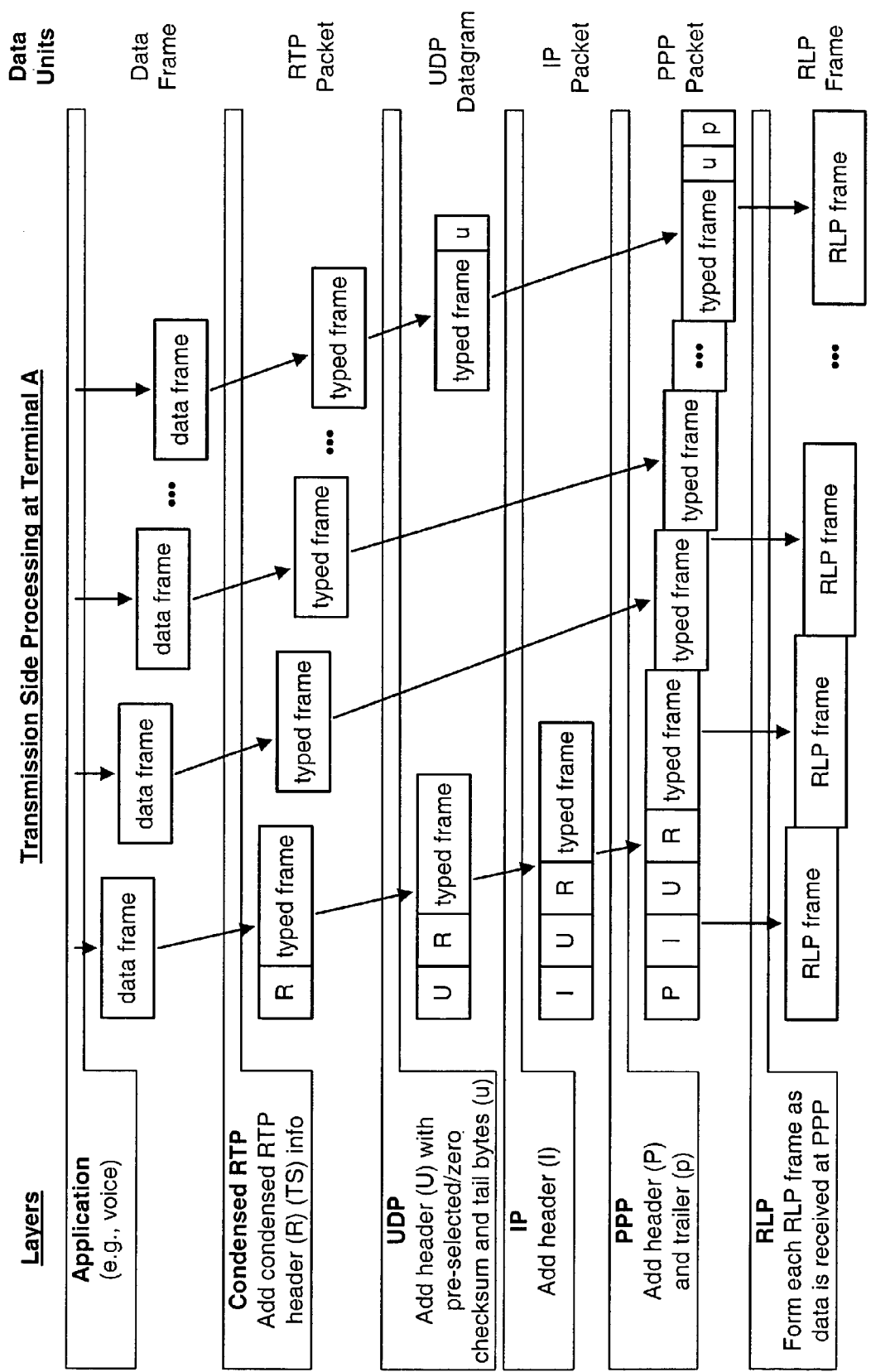
FIG. 3A shows the processing at terminal A for early packet transmission.

FIG. 3A is a diagram illustrating a specific embodiment of the processing at terminal A for early packet transmission. The layers and protocols are shown on the left side of FIG. 3A, and the data unit for each layer is shown on the right side.

An application at the application layer (e.g., a voice, video, or some other application) generates and provides data frames. In one embodiment, each data frame has a fixed size, and a specific number of data frames is bundled for each packet. For a voice application, a vocoder may provide voice frames with variable size. In this case, each voice frame may be padded to generate a corresponding fixed-size data frame. In another embodiment, the data frames may have variable sizes and a variable number of data frames may also be bundled into each packet.

The Condensed RTP in the presentation layer receives the data frames from the application and generates a "condensed" RTP header (R) for the first data frame in each packet. In one embodiment, this condensed RTP header includes a time-stamp (TS) for all of the data frames to be bundled in the packet. The condensed RTP header generated by the Condensed RTP includes only a portion of the information included in the RTP header generated by the RTP. For simplicity, the condensed RTP header is referred to herein as the RTP header. The RTP header is appended at the front of the first data frame. In an embodiment, the Condensed RTP also generates a header for each data frame. The frame header is appended to the data frame to provide a corresponding "typed" frame. Each frame header includes pertinent information used to recover and/or process the associated data frame.

The UDP in the transport layer receives the typed frames from the Condensed RTP and generates a UDP header (U) for the first frame in each packet. The UDP header (which may include a pre-selected checksum or a zero checksum, as described below) may be appended in front of the RTP header, as shown in FIG. 3A. The UDP may process all other typed frames in the same packet to generate a set of tail bytes (u), which is appended at the end of the last typed frame in the packet. The generation of the checksum and tail bytes is described in further detail below.

The IP in the network layer receives the typed frames via the UDP and generates an IP header (I) for the first frame in each packet. The eventual size of the IP packet needs to be known when the IP header is created. The IP packet length is pre-selected or chosen to be large enough to hold the maximum amount of data expected to be generated for the time interval covered by each IP packet. If the amount of data generated is less than the IP packet length, then the packet can be padded to the pre-selected length. The IP header (which includes the proper address fields) may then be appended in front of the UDP header, as shown in FIG. 3A. The IP may simply pass all other typed frames in the same packet to the next lower layer.

The PPP receives the typed frames via the IP and generates a PPP header (P) for the first frame in each packet. The PPP header may then be appended in front of the IP header, as shown in FIG. 3A. The PPP further processes all other typed frames in the same packet to generate a trailer (p). The PPP trailer includes a CRC value that may be used by the receiver to check whether the PPP packet was received correctly or in error. The PPP trailer may be appended after the UDP tail bytes, as also shown in FIG. 3A.

The RLP forms an RLP frame for transmission whenever a sufficient amount of data is available at the PPP. A buffer may be used to temporarily store the data from the PPP. This buffer may be maintained such that it does not overflow or underflow, which may be ensured by selecting an appropriate rate for the over-the-air transmission. A buffer underflow may be undesirable because (1) an incomplete RLP frame may be formed and transmitted, which may then cause various kinds of errors, and (2) a scheduler may schedule another process if it detects an empty buffer. If the sizes of the PPP packet and RLP frames are known, then a fixed number of RLP frames is formed and transmitted for each PPP packet.

As shown in FIG. 3A, the collection of data frames that make up a packet is overlapped with the transmission of RLP frames for the packet. Moreover, RLP frames are formed and transmitted whenever a sufficient amount of data is available to the RLP, instead of having to wait until the entire PPP packet is received. This early packet transmission can greatly reduce the delays associated with the bundling of a number of data frames in each packet.

For simplicity, the embodiment in FIG. 3A shows an implementation whereby each PPP packet includes one IP packet, which in turn includes one UDP datagram, which in turn includes one RTP packet. The early packet transmission may also be used even when the above condition does not hold true.

Figure 3B:
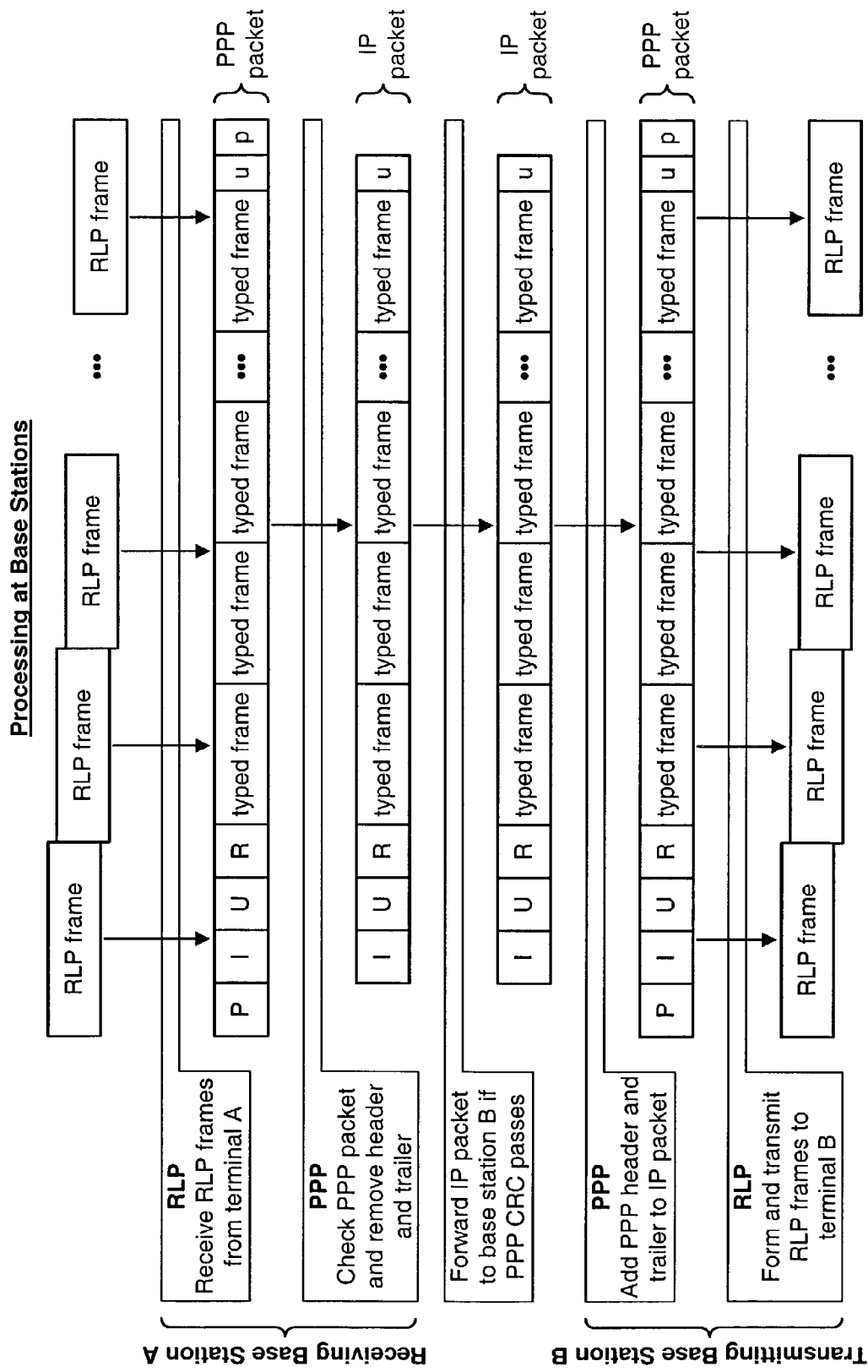
FIG. 3B shows the processing at the base stations.

FIG. 3B is a diagram illustrating a specific embodiment of the processing at the receiving and transmitting base stations. The RLP frames transmitted by terminal A for each PPP packet are received by base station A, which processes these RLP frames to recover the PPP packet. The PPP at base station A then checks the PPP packet using the CRC value in the trailer (p) appended at the end of the packet. If the PPP packet passes the CRC check, then the PPP header and trailer are removed from the PPP packet to obtain the encapsulated IP packet, which is then forwarded (possibly via other system entities) to base station B.

The PPP at base station B processes IP packets received from base station A. For each received IP packet, the PPP generates a PPP header and trailer for the packet, which are then appended to the start and the end of the IP packet to form a PPP packet. The RLP at base station B then forms RLP frames for each PPP packet, and these RLP frames are transmitted to terminal B.

Figure 3C:
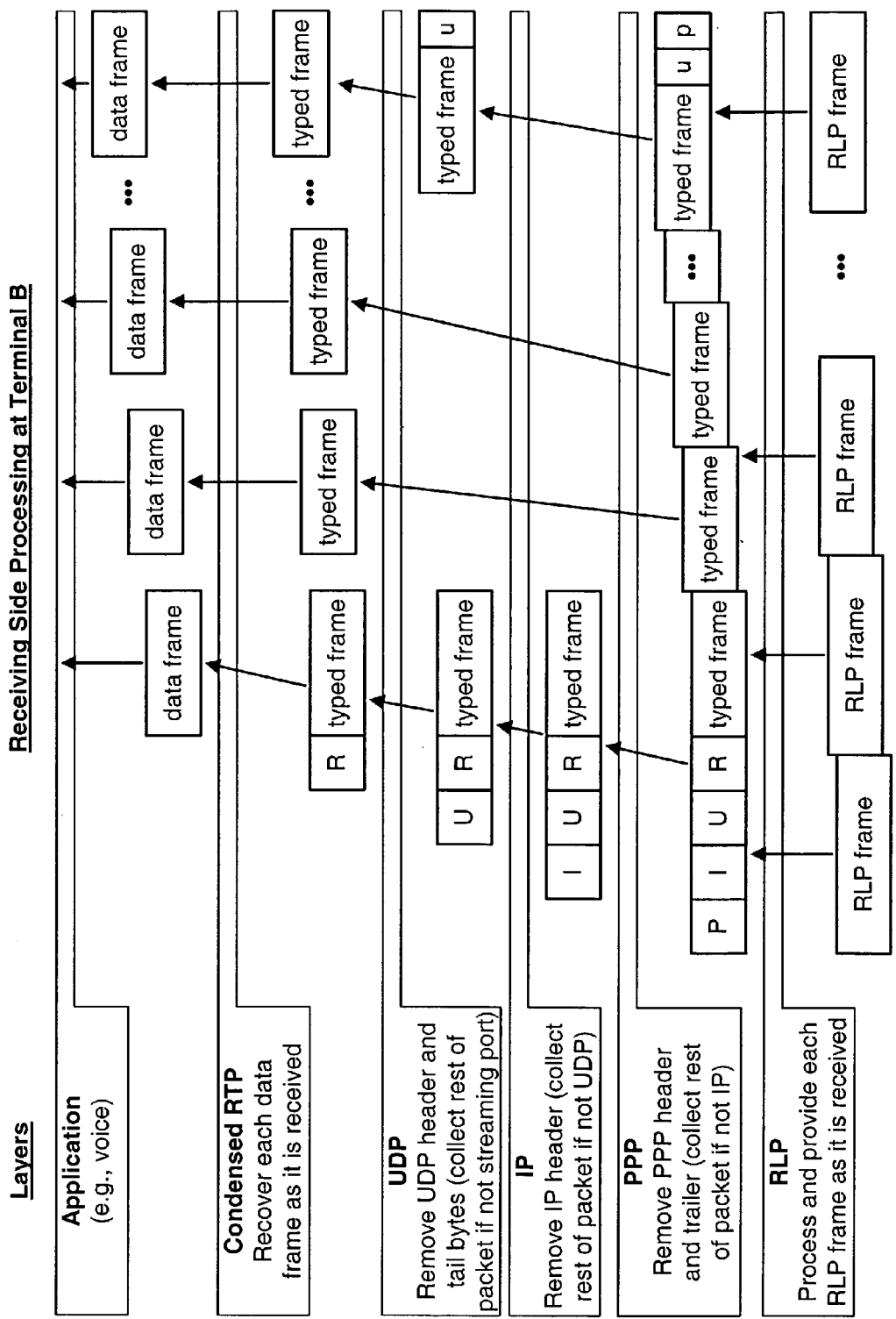
FIG. 3C shows the processing at terminal B for early packet playout.

FIG. 3C is a diagram illustrating a specific embodiment of the processing at terminal B for early packet playout.

The RLP at terminal B receives RLP frames from base station B, processes each RLP frame as it is received, and provides data to the PPP. A buffer may be maintained to store the data in the received RLP frames.

The PPP removes the PPP header and trailer appended in each PPP packet. The PPP may optionally check each PPP packet using the CRC value in the PPP trailer, and may provide an indication of whether the packet was received correctly or in error. For each received PPP packet that includes an IP packet, the PPP provides data to the next higher layer as it becomes available. Otherwise, for each received PPP packet that does not include an IP packet, the PPP collects data for the entire PPP packet before providing it to the next higher layer.

The IP receives the data from the PPP and removes the IP header appended at the start of each IP packet. For each received IP packet that encapsulates a UDP datagram, the IP provides data to the next higher layer as it becomes available. Otherwise, for each received IP packet that does not encapsulate a UDP datagram, the IP collects data for the entire IP packet before providing it to the next higher layer.

The UDP receives the data from the IP and removes the UDP header and tail bytes in each UDP datagram. If the UDP header includes a pre-selected checksum, then the UDP computes a checksum for the received UDP datagram. Alternatively, if the UDP header includes a zero checksum, then the UDP does not perform the checksum computation. For each received UDP datagram that is not part of a streaming port, the UDP collects data for the entire UDP datagram before providing it to the next higher layer. Otherwise, for each received UDP datagram that is part of a streaming port, the UDP provides data to the next higher layer as it becomes available. If data frames are provided as they are received (i.e., for early playout) and since the CRC value for each UDP datagram is appended at the end of the datagram, then any errors in the datagram would be detected too late to be useful. In that case, the UDP may skip the CRC check.

The Condensed RTP receives data from the UDP and removes the RTP header appended at the start of each RTP packet. The Condensed RTP then recovers each data frame in the packet using the header appended to each typed frame. The Condensed RTP provides to the application each data frame as it is recovered. The Condensed RTP may also provide the time-stamp and possibly other information that are included in the RTP header.

As shown in FIG. 3C, the playout of data frames at the receiving terminal can commence once the terminal has received the RTP header plus at least one data frame, instead of waiting until the entire packet has been received. Moreover, the playout of the data frames in each packet is overlapped with the reception of the RLP frames for the packet. This early packet playout can reduce the delays associated with bundling a number of data frames in each packet.

The playout of the received data frames may be dependent on the type of data being sent. For example, vocoders are generally tolerant of errors in voice data. Thus, playing out voice data that contains some bit errors is generally no worse than playing out no data for that time interval, and may be better if there are only a few bit errors in the data. For other types of data (e.g., control data from sensors), it may be better to check the integrity of each received message or packet and throw out bad data instead of using it in further processing.

In the embodiment shown in FIGS. 3A through 3C, the early packet transmission and playout is achieved by performing partial packet processing at the transmitting and receiving terminals. Complete packets are exchanged between the base stations and other system entities, as shown in FIG. 3B. This embodiment can simplify the implementation of the early packet transmission and playout in the wireless communication system. In particular, only the terminals need to be designed to perform the partial packet processing, and other system entities can operate in the normal manner on complete packets. If the frame/packet processing is performed in software at the terminals, then all that may be required to implement the early packet transmission and playout is to install upgraded software in the terminals.

As shown in FIGS. 3A and 3C, the protocols in the protocol stacks at the transmitting and receiving terminals (with the exception of the Condensed RTP) perform the normal functions for these protocols. However, the protocols are implemented such that they operate on partial packets instead of complete packets. This then allows the data from one protocol to be passed to the next protocol as it becomes available, instead of having to wait for the entire packet. At the receiving terminal, a mechanism (e.g., the frame header) is provided to allow individual data frames to be recovered and processed as they are received.

In an embodiment, to further reduce delays, partial packets may also be exchanged between the base stations and other system entities. In an example implementation, each packet may be partitioned into multiple segments by the receiving base station. The segments may then be forwarded as they are received. Each segment may correspond to one data frame or some other data unit. The segmentation may be performed as described in U.S. patent application Ser. No. 09/932,121, entitled "Method and Apparatus for Message Segmentation in a Wireless Communication System," filed Aug. 16, 2001, assigned to the assignee of the present application and incorporated herein by reference.

Figure 4A:
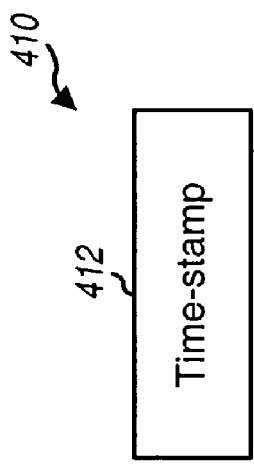
FIGS. 4A and 4B respectively show an RTP header provided by a Condensed RTP and a UDP header provided by the UDP for each packet.

FIG. 4A is a diagram of an embodiment of an RTP header 410 that may be provided by the Condensed RTP for each packet. In this embodiment, RTP header 410 includes a time-stamp field 412 for a 32-bit time-stamp value that indicates the sampling instant of the first octet in the RTP packet. This time-stamp value may be used by the receiving terminal for synchronization and jitter calculations.

Additional and/or different fields may be included in the RTP header, and this is within the scope of the invention. The specific fields to be included in the RTP header may be dependent on the application being supported. For example, different sets of fields may be used for voice, video, and other real-time applications.

For applications with multiple streams (e.g., audio, video, and so on), the RTP header may be defined to include a synchronization source indication field. This field allows multiple streams to be synchronized at playout. The same synchronization source can indicate that the timestamps are synchronized, and the same timestamp can mean that the playout should be simultaneous. The RTP header may also be defined to include fields to indicate the timestamp step (e.g., 100 ms in a bundle), frame duration (e.g., 20 ms), bundle type (e.g., SMV vocoder frames, EVRC vocoder frames, temp data, and so on). For video, the RTP header may be defined to include fields for encoder type, frame duration, and so on. Thus, various fields may be included in the RTP header, and this is within the scope of the invention.

The use of an RTP header can make it easier to send certain types of data (e.g., control data). For example, in cases where data is made available on a schedule and the overall data rate is lower than the over-the-air data transmission capacity, it is possible to transmit the header for a packet in advance of the availability of the data. An example of this would be an application that periodically reads the value of a sensor or the position of a control and transmits the output data in the packet.

Figure 4B:
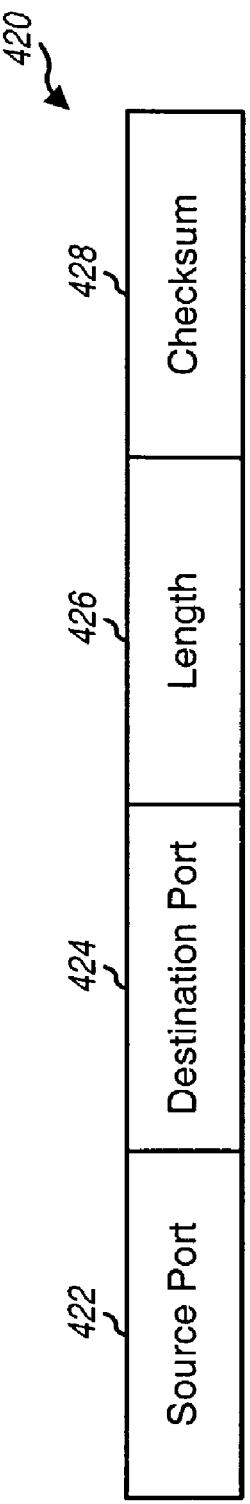

FIG. 4B is a diagram of a UDP header 420 that may be provided by the UDP for each packet. UDP header 420 includes a source port field 422, a destination port field 424, a length field 426, and a checksum field 428.

The checksum field includes a 16-bit (one's complement) value of the sum of a pseudo IP header, the UDP header, the UDP data, and padding (if needed). The pseudo IP header includes some of the information from the IP header. The checksum can be used to determine whether or not the UDP datagram has been received correctly or in error. The checksum for a UDP datagram may be computed the same way as for a TCP header checksum, which is described in RFC793.

In a first embodiment, a zero checksum is included in the checksum field. As defined by RFC768, the zero checksum may be used to indicate that no checksum has been computed for the UDP datagram, in which case the receiving device can skip the checksum processing. For this embodiment, the tail bytes do not need to be appended at the end of the UDP datagram since there is no need to make the checksum match the data. However, the precalculated length in the IP header needs to reflect the correct overall length for the IP packet. This embodiment may be used if the checksum will be ignored by the receiving device.

In a second embodiment, a pre-selected checksum value is included in the checksum field of the UDP header. For this embodiment, the checksum computation may be performed in the normal manner. However, the tail bytes (u) are computed/selected in a manner such that the pre-selected checksum is correct. In this way, the pre-selected checksum can be generated early and still be used by the receiving device to check the UDP datagram. This embodiment may be used where end-to-end integrity of the data is important. Some example applications where the end-to-end integrity may be important are for sensor data and control position.

In a third embodiment, the checksum field is used to carry part of the data for the UDP datagram. This embodiment may be used to reduce the overhead for each UDP datagram, so that the minimum number of RLP frames is used to send a UDP datagram. The data for the checksum field may be restricted so that it is not equal to zero. This may be ensured by reserving a bit in the checksum field and setting this bit to one. The tail bytes may be computed so that the checksum value is correct. This embodiment is equivalent to the second embodiment in that the checksum value is forced to match the calculated tail bytes included at the end of the UDP datagram.

The other fields in UDP header 420 are described in RFC768.

In an embodiment, a header is provided for each data frame and contains pertinent information used by the receiving terminal to recover and/or process the data frame. As an example, for voice application, each voice frame may be provided at one of a number of possible rates (e.g., full, half, quarter, and eighth rates). (Each voice frame may be padded to provide a corresponding fixed-size data frame). In this case, the header for each data frame would indicate the rate of the corresponding voice frame. A two-bit header may be used to indicate one of four possible rates. This rate information would then be used by the receiving terminal to properly process and play out the voice frames. As another example, an application may provide variable size data frames. In this case, the header for each data frame may indicate the size of the frame. This size information may then be used by the receiving terminal to determine the start and end of each data frame.

The frame header represents one mechanism for providing pertinent information needed by the receiving device to recover and process the data frames bundled in each packet. Other mechanisms may also be implemented, and this is within the scope of the invention. As an example, a table of contents may be provided for all data frames bundled in a packet. This table of contents can include one entry for each data frame in the packet, and each entry can include the pertinent information needed to recover and process the associated data frame. The table of contents may be included, for example, as part of the RTP header. The table of contents may be used if the characteristics of the data frames to be bundled can be ascertained early.

In general, it is desirable to reduce the amount of overhead for each protocol to improve efficiency and achieve other benefits. The header and trailer (if any) for the data unit of each protocol may thus be designed such that overhead is reduced while providing the necessary information. To simplify the system design, standard IP packets may be exchanged between the various system entities. In this case, the protocols above the IP may be defined such that they are modified forms of existing protocols (e.g., the RTP and UDP), but with different unique protocol identifiers. Using different unique protocol identifiers allows modified protocol packets to be formed and processed according to the rules of the modified protocols, while standard protocol packets can continue to be processed according to the rules of the standard protocols. The headers and trailers (if any) of the modified protocols may be defined such that they provide the pertinent information with minimum overhead. For example, the source and destination port fields in the UDP header may be omitted, forming a new "Modified UDP", since these are typically not needed for the wireless communication system where the identities of the transmitting and receiving terminals are already known by the system. If end-to-end datagram integrity is not important, then the UDP checksum may also be omitted from the "Modified UDP". With a smaller overhead, it may be possible to reduce the bundle size and still meet the timing constraint that the headers plus data frames plus trailers can be sent over the air within the total time interval represented by the data frames. A smaller bundle size is preferable for most real-time applications to reduce delays.

In the embodiment described above, the frame header includes the information used to recover and/or process the data frames bundled in each packet. In other embodiments, this frame information may be included in a header generated by a modified protocol. For example, a modified UDP may be defined that can include the frame information in a modified UDP header.

Figure 5A:
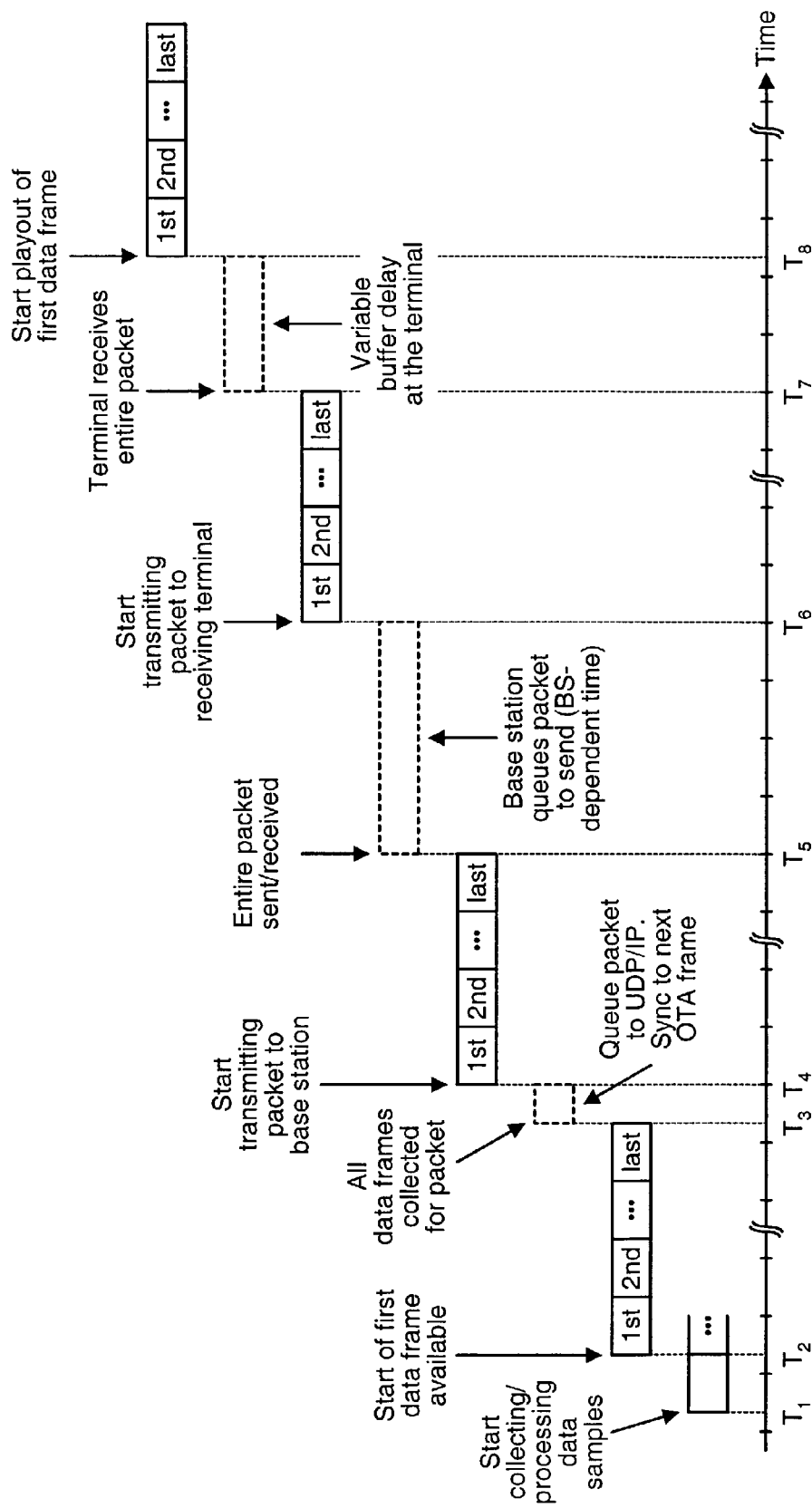
FIG. 5A shows the processing and transmission of a complete packet, as is conventionally performed.

FIG. 5A is a diagram illustrating the processing and transmission of a complete packet, as it is conventionally performed.

At time $T_1$, an application at a transmitting terminal A starts collecting and processing (e.g., encoding) data samples. For a voice application, the data samples may be voice samples for a speech signal. Starting at time $T_2$, the first data frame becomes available. A number of data frames may be bundled in a packet, and at time $T_3$, all data frames for the packet are collected. The packet is then provided to the lower layers (e.g., UDP/IP) for further processing by these layers.

The RTP, UDP, IP, PPP, and RLP at terminal A each receives and processes the packet from the next higher layer and provides its packet to the next lower layer. A certain amount of delays is typically incurred for the packet due to processing and queuing delays at terminal A.

Starting at time $T_4$, which is synchronous with an over-the-air transmission frame, the processed packet is transmitted by terminal A to a receiving base station A. At time $T_5$, the entire packet has been transmitted by terminal A and received by base station A. Base station A then processes (e.g., checks) the received packet and forwards it to a transmitting base station B. A certain amount of delays may be encountered by the packet due to processing and queuing delays at the base stations.

At time $T_6$, base station B starts transmitting the packet to a receiving terminal B. At time $T_7$, the entire packet has been transmitted by base station B and received by terminal B. The RLP, PPP, IP, UDP, and RTP at terminal B each receives and processes the packet from the next lower layer and provides its packet to the next higher layer. A certain amount of delays is typically incurred for the packet due to processing and variable queuing delays at terminal B to allow for jitter in the delivery of the packet by the network to the terminal. Starting at time $T_8$, the first data frame in the packet is played out.

Figure 5B:
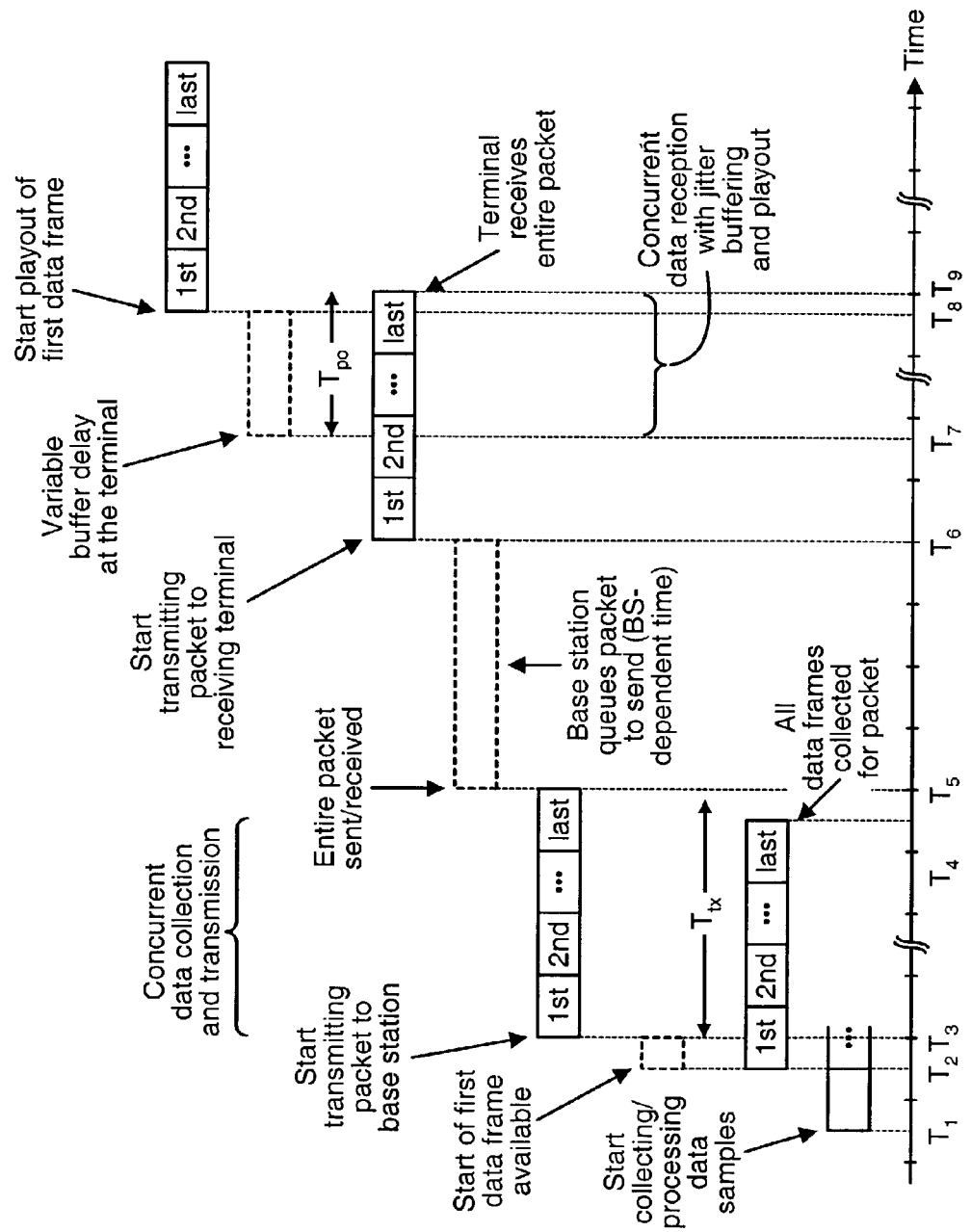
FIG. 5B shows the processing and transmission of a packet with early packet transmission and playout.

FIG. 5B is a diagram illustrating the processing of a packet with early packet transmission and playout, using the techniques described herein.

At time $T_1$, the application at the transmitting terminal A starts collecting and processing data samples. Starting at time $T_2$, the first data frame for the packet becomes available. The Condensed RTP, UDP, IP, PPP, and RLP at terminal A each receives and processes data for the packet as it becomes available.

After a certain amount of processing and queuing delays, starting at time $T_3$, the first portion of the packet is transmitted by terminal A to the receiving base station A. At time $T_4$, all data frames for the packet are collected. Between times $T_3$ and $T_4$, data collection/processing is performed concurrently with data transmission. At time $T_5$, the entire packet has been transmitted by terminal A and received by base station A. The packet is then processed (e.g., checked) by base station A and forwarded to base station B.

At time $T_6$, base station B starts transmitting the packet to receiving terminal B. The RLP, PPP, IP, UDP, and Condensed RTP at terminal B each processes data for the packet as it is received by terminal B. At time $T_7$, the packet headers have been received and the queuing of data frames in the jitter queue begins. After a certain amount of processing and variable queuing delays to allow for network packet delivery jitter, starting at time $T_8$, the first data frame in the packet is played out from the jitter buffer. At time $T_9$, the entire packet has been transmitted by base station B and received by terminal B. Between times $T_7$ and $T_9$, data reception/processing is performed concurrently with data jitter buffer queuing and playout.

As shown in FIG. 5B, the early packet transmission reduces delays by $T_{tx}$ on the transmitting side. Moreover, the early packet playout reduces delays by $T_{po}$ on the receiving side. As also suggested by FIG. 5B, the amount of reduction in delays increases as more data frames are bundled together for each packet.

FIG. 6A is a flow diagram of a process 600 to perform early packet transmission for a particular application at a transmitting device. Initially, the protocols (e.g., RTP, UDP, IP, and PPP) are configured to perform streaming processing for the application (step 612). The protocols in the protocol stack are thus modified in their manner of operation. Step 612 only needs to be performed once at the start of a streaming session, as indicated by the dashed box for step 612.

The processing for each packet to be transmitted can proceed as follows. A set of data frames to be bundled in a packet for transmission is received (step 614). These data frames may be received one at a time as it becomes available from the application. Each protocol in the protocol stack generates a header and possibly a trailer for the packet, which are appended at the proper locations in the packet (step 616). To reduce delays, the headers for the protocols in the protocol stack may be generated and transmitted before receiving any of the data frames for the packet.

A transmission frame is generated as a sufficient amount of data in the headers/trailers and data frames becomes available (step 618). Each transmission frame may correspond to an RLP frame or some other unit of transmission, depending on the particular air-interface used by the system. Each transmission frame is transmitted, typically over a particular time interval (e.g., 5, 10, or 20 msec), as it is generated (step 620).

The processing by steps 614, 616, and 618 is streamed such that each protocol can operate on partial packet. Thus, transmission frames can be generated before all of the data frames to be bundled have been received.

FIG. 6B is a flow diagram of a process 650 to perform early packet playout for a particular application at a receiving device. Initially, the protocols (e.g., RTP, UDP, IP, and PPP) are configured to perform streaming processing for the application (step 652). Again, step 652 only needs to be performed once at the start of a streaming session, as indicated by the dashed box.

The processing for each received packet can proceed as follows. A number of transmission frames for the packet are received and processed (step 654). These transmission frames may be received one at a time from an over-the-air transmission. Each protocol in the protocol stack then processes and removes the header and possibly the trailer appended to the packet by its peer protocol at the transmitting side (step 656). Each data frame in the packet is then recovered and provided as a sufficient amount of data in the received transmission frames becomes available (step 658).

The processing by steps 654, 656, and 658 is streamed such that each protocol can operate on partial packet. Thus, data frames can be recovered and provided for playout before all of the transmission frames for the packet have been received.

Figure 7:
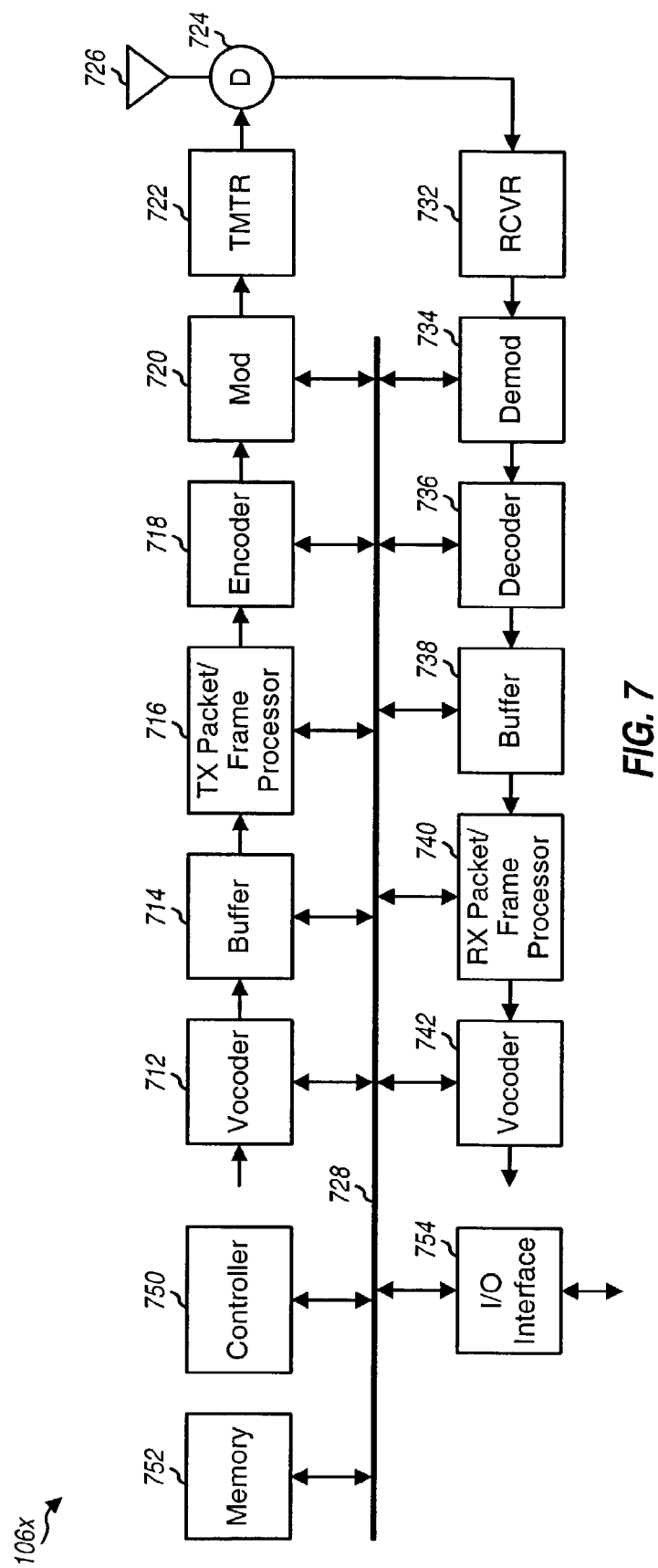
FIG. 7 is a block diagram of a terminal.

FIG. 7 is a block diagram of an embodiment of a terminal 106x, which is capable of implementing early packet transmission and playout. Terminal 106x may be a cellular phone, a handset, a modem, or some other device or design.

In the transmit path, one or more applications generate data that is temporarily stored in a buffer 714. For example, for a voice application, a speech signal may be received via an input/output (I/O) interface 754 and conditioned and digitized by pre-conditioning circuitry (not shown in FIG. 7) to provide speech data. A vocoder 712 then compresses the speech data to provide voice frames that are then stored in buffer 714.

As sufficient amount of data becomes available, a TX packet/frame processor 716 receives and processes the data from buffer 714 to form transmission frames (e.g., RLP frames). TX packet/frame processor 716 may perform the processing shown in FIG. 3A for the Condensed RTP, UDP, IP, and PPP and would then generate the proper headers and trailers for each packet. The data in each transmission frame is coded and interleaved by an encoder 718 and further modulated by a modulator (Mod) 720. The coding, interleaving, and modulation are typically performed in accordance with the air interface being implemented. For a CDMA system, the processing by modulator 720 may include covering the data with a channelization code and spectrally spreading the covered data with a pseudo-random noise (PN) sequence. The modulated data is then conditioned (e.g., filtered, amplified, and frequency upconverted) by a transmitter unit (TMTR) 722 to provide a modulated signal, which is then routed through a duplexer (D) 724 and transmitted via an antenna 726.

In the receive path, one or more transmitted signals are received by antenna 726, routed through duplexer 724, and provided to a receiver unit (RCVR) 732. Receiver unit 732 conditions (e.g., filters, amplifies, and frequency downconverts) and digitizes the received signal to provide data samples. The data samples are demodulated by a demodulator (Demod) 734 and further deinterleaved and decoded by a decoder 736. The processing by demodulator 734 and decoder 736 is complementary to that performed by the modulator and encoder at the transmitting device. The decoded data is temporarily stored in a buffer 738.

As sufficient amount of data becomes available, an RX packet/frame processor 740 retrieves and processes the data from buffer 738 to recover data frames. RX packet/frame processor 740 may perform the processing shown in FIG. 3C for the Condensed RTP, UDP, IP, and PPP. In particular, processor 740 removes headers and trailers that have been appended to each packet and may further perform the checking for each packet based on the checksum provided by the UDP. For voice communication, a vocoder 742 decompresses each data frame to provide speech data. Additional circuitry (not shown in FIG. 7) would then condition the speech data to provide a speech signal suitable for an output device (e.g., a speaker).

Controller 750 may perform various functions for voice/data communication and may also direct the operation of various processing units within terminal 106x. Memory 752 may store data and program codes used by various processing units within terminal 106x. The interface between various processing units within terminal 106x may be provided by a bus 728.

For clarity, specific embodiments of the early packet transmission and playout have been described above. Other embodiments may also be contemplated and are within the scope of the invention. Some possible variations are described below.

Other protocols than the specific ones described above may be used for early packet transmission and playout. For example, the TCP may be used for the transport layer instead of the UDP. In that case, the receiving device would acknowledge each received packet. Other protocols may also be used for the data link and physical layers. These protocols may generate other over-the-air transmission frames instead of RLP frames.

One or more protocols may also be omitted from the protocol stack. For example, it may be possible to omit the RTP. However, any modification of the protocol stack may affect the operation of various system entities. For example, a standard router or firewall may recognize only packets with certain protocols and may reject all other packets. Thus, a non-standard protocol stack may be used but the system entities may need to be designed to operate on such non-standard protocol stack.

The data frames may also be processed prior to being bundled in a packet. For example, a CRC may be generated and appended to each data frame. This frame-level CRC allows the receiving device to perform an error check on each individual frame prior to playout.

The data frames bundled in each packet may be the same size or may have variable sizes. The use of a fixed size for the data frames can assist in error recovery. However, variable sizes may provide greater flexibility and/or improved efficiency since padding may not be needed for the data frames. The overall length of each packet needs to be predictable so that the proper length can be placed in the IP header. Padding to achieve the correct length can occur at any locations throughout the packet as is expedient.

In general, the early packet transmission and playout techniques described herein may be used for packet transmissions over any wireless communication systems where the processing (e.g., for data framing) and/or queuing can cause delays. These techniques may be advantageously used if the processing/queuing delays can impact the usefulness or performance of an application. Some examples of such applications are voice (e.g., voice over IP), video (e.g., for teleconferencing, vehicle control, and so on), time-sensitive sensor data collection, fusion and dissemination, control systems, real-time applications, and so on.

For voice application, the early packet transmission and playout can reduce the delays for voice frames caused by the communication system. User annoyance may then be lowered by reducing the delays in receiving speech utterances. Similar benefits may be obtained for other real-time application (e.g., video).

In addition, improved quality may be achieved by the early playout of packets. If data frames are played out as they are received, then an error in any portion of the packet would only affect the data frame corresponding to that packet portion and not the entire packet. If only part of a given packet is received in error, then the playout of the bundle for that packet would be close to the original. In contrast, if entire packets are processed (as is normally done), then an error in any part of the packet may cause the entire packet to fail the checksum test by the UDP, and the entire bundle may then be discarded. The early playout may thus potentially improve output (e.g., sound or video) quality.

The techniques described herein may also be advantageously used when data is time/delay sensitive and the combined size of the packet headers plus the packet data is larger than the capacity of a single over-the-air transmission frame.

The early packet transmission and playout techniques described herein may be implemented by various means. For example, these techniques may be implemented in hardware, software, or a combination thereof. For a hardware implementation, the elements used to implement any one or a combination of the techniques (e.g., TX and RX packet/frame processors 716 and 740 in FIG. 7) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the early packet transmission and playout techniques may be implemented with modules (e.g., procedures, functions, and so on) that perform the functions described herein. The software codes may be stored in a memory unit (e.g., memory 752 in FIG. 7) and executed by a processor (e.g., controller 750). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of processing data for transmission in a wireless communication system, comprising:
   receiving a set of data frames from an application layer to be bundled in a packet for transmission;
   generating one or more headers for the packet for one or more protocols in a protocol stack;
   passing partially complete protocol data units from one or more upper layer protocols to one or more lower layer protocols, wherein for each protocol data unit, at least one of the partially complete protocol data units are passed to the lower layer protocol prior to the upper layer protocol receiving all data needed to generate a complete protocol data unit; and
   generating a transmission frame suitable for transmission as a sufficient amount of data in the one or more headers and the application data frames becomes available, wherein transmission frames are generated prior to receiving all application data frames to be bundled in the packet, and wherein a buffer that does not underflow or overflow, by selecting an appropriate rate, is used to store the data.

2. The method of claim 1, further comprising:
   generating a header for each data frame, wherein the data frame header includes information used to process or recover the associated data frame.

3. The method of claim 2, wherein the header for each data frame indicates a particular rate or size of the data frame.

4. The method of claim 1, wherein the protocol stack includes a condensed Real-Time Transport Protocol (RTP) operative to generate a condensed RTP header for the packet.

5. The method of claim 4, wherein the condensed RTP header includes a time-stamp for the data frames bundled in the packet.

6. The method of claim 1, wherein the protocol stack includes User Datagram Protocol (UDP) operative to provide a UDP header for the packet.

7. The method of claim 6, wherein the UDP header includes either a pre-selected checksum or a zero checksum for the packet.

8. The method of claim 7, wherein the UDP is further operative to provide a set of tail bytes matched to a pre-selected checksum included in the UDP header.

9. The method of claim 1, wherein a transmission frame with data for the one or more headers is generated and transmitted prior to receiving a first data frame to be bundled.

10. The method of claim 1, wherein each data frame corresponds to a voice frame generated by a voice application.

11. The method of claim 1, wherein the data frames have a fixed size.

12. The method of claim 1, wherein the data frames have variable sizes.

13. The method of claim 1, wherein the size of each packet is pre-selected based on a maximum amount of data expected to be received for a time interval covered by the packet.

14. The method of claim 13, wherein the protocol stack includes Internet Protocol (IP), and wherein an IP header for the packet includes a value indicative of the pre-selected length for the packet.

15. The method of claim 1, wherein the protocol stack includes Real-Time Transport Protocol (RTP), User Datagram Protocol (UDP), and Internet Protocol (IP), or variants thereof.

16. The method of claim 1, wherein the wireless communication system is a CDMA system.

17. A method of processing data at a receiving device in a wireless communication system, comprising:
   receiving a plurality of transmission frames for a packet having included therein a set of application data frames bundled together for transmission;
   removing one or more headers appended to the packet for one or more protocols in a protocol stack;
   passing partially complete protocol data units from one or more lower layer protocols to one or more upper layer protocols, wherein for each protocol data unit, at least one of the partially complete protocol data units are passed to the upper layer protocol prior to the lower layer protocol receiving all data needed to generate a complete protocol data unit; and providing each application data frame in the packet to an application layer as a sufficient amount of data in the received transmission frames becomes available, wherein the application data frames are provided prior to receiving all transmission frames for the packet, and wherein a buffer that does not underflow or overflow, by selecting an appropriate rate, is used to store the data.

18. The method of claim 17, further comprising:
checking the packet based on a checksum included in one of the one or more headers.

19. The method of claim 17, further comprising:
obtaining a header appended to each data frame; and
processing each data frame in the packet based on information included in the data frame header.

20. A memory communicatively coupled to a digital signal processing device (DSPD) capable of interpreting digital information to:
receive a set of data frames from an application layer to be bundled in a packet for transmission;
generate one or more headers for the packet for one or more protocols in a protocol stack;
pass partially complete protocol data units from one or more upper layer protocols to one or more lower layer protocols, wherein for each protocol data unit, at least one of the partially complete protocol data units are passed to the lower layer protocol prior to the upper layer protocol receiving all data needed to generate a complete protocol data unit; and
generate a transmission frame suitable for transmission as a sufficient amount of data in the one or more headers and the application data frames becomes available, wherein transmission frames are generated prior to receiving all application data frames to be bundled in the packet, and wherein a buffer that does not underflow or overflow, by selecting an appropriate rate, is used to store the data.

21. An apparatus in a wireless communication system, comprising:
means for receiving a set of data frames from an application layer to be bundled in a packet for transmission;
means for generating one or more headers for the packet for one or more protocols in a protocol stack;
means for passing partially complete protocol data units from one or more upper layer protocols to one or more lower layer protocols, wherein for each protocol data unit, at least one of the partially complete protocol data units are passed to the lower layer protocol prior to the upper layer protocol receiving all data needed to generate a complete protocol data unit; and
means for generating a transmission frame suitable for transmission as a sufficient amount of data in the one or more headers and the application data frames becomes available, wherein transmission frames are generated prior to receiving all application data frames to be bundled in the packet, and wherein a buffer that does not underflow or overflow, by selecting an appropriate rate, is used to store the data.

22. A device in a wireless communication system, comprising:
a processor operative to receive a set of application data frames to be bundled in a packet for transmission, generate one or more headers for the packet for one or more protocols in a protocol stack, protocol stack, pass partially complete protocol data units from one or more upper layer protocols to one or more lower layer protocols, wherein for each protocol data unit, at least one of the partially complete protocol data units are passed to the lower layer protocol prior to the upper layer protocol receiving all data needed to generate a complete protocol data unit, and generate a transmission frame suitable for transmission as a sufficient amount of data in the one or more headers and the application data frames becomes available, wherein transmission frames are generated prior to receiving all application data frames to be bundled in the packet, and wherein a buffer that does not underflow or overflow, by selecting an appropriate rate, is used to store the data.

23. The device of claim 22, wherein the processor is further operative to generate a header for each data frame and having included therein information used to process or recover the data frame.

24. A wireless terminal comprising the device of claim 22.

25. An apparatus in a wireless communication system, comprising:
means for receiving a plurality of transmission frames for a packet having included therein a set of application data frames bundled together for transmission;
means for removing one or more headers appended to the packet for one or more protocols in a protocol stack;
means for passing partially complete protocol data units from one or more lower layer protocols to one or more upper layer protocols, wherein for each protocol data unit, at least one of the partially complete protocol data units are passed to the upper layer protocol prior to the lower layer protocol receiving all data needed to generate a complete protocol data unit; and means for providing each application data frame in the packet to an application layer as a sufficient amount of data in the received transmission frames becomes available, wherein the application data frames are provided prior to receiving all transmission frames for the packet, and wherein a buffer that does not underflow or overflow, by selecting an appropriate rate, is used to store the data.

26. A device in a wireless communication system, comprising:
a processor operative to receive a plurality of transmission frames for a packet having included therein a set of application data frames bundled together for transmission, remove one or more headers appended to the packet for one or more protocols in a protocol stack, pass partially complete protocol data units from one or more lower layer protocols to one or more upper layer protocols, wherein for each protocol data unit, at least one of the partially complete protocol data units are passed to the upper layer protocol prior to the lower layer protocol receiving all data needed to generate a complete protocol data unit, and provide each application data frame in the packet to an application layer as a sufficient amount of data in the received transmission frames becomes available, wherein the data frames are provided prior to receiving all transmission frames for the packet, and wherein a buffer that does not underflow or overflow, by selecting an appropriate rate, is used to store the data.

27. The device of claim 26 wherein the protocol is further operative to obtain a header appended to each data frame and to process each data frame in the packet based on information included in the data frame header.

28. A wireless terminal comprising the device of claim 26.

* * * * *